(No Model.)
A. SHAFFER.
SEEDING MACHINE.
No. 294,158. Patented Feb. 26, 1884.
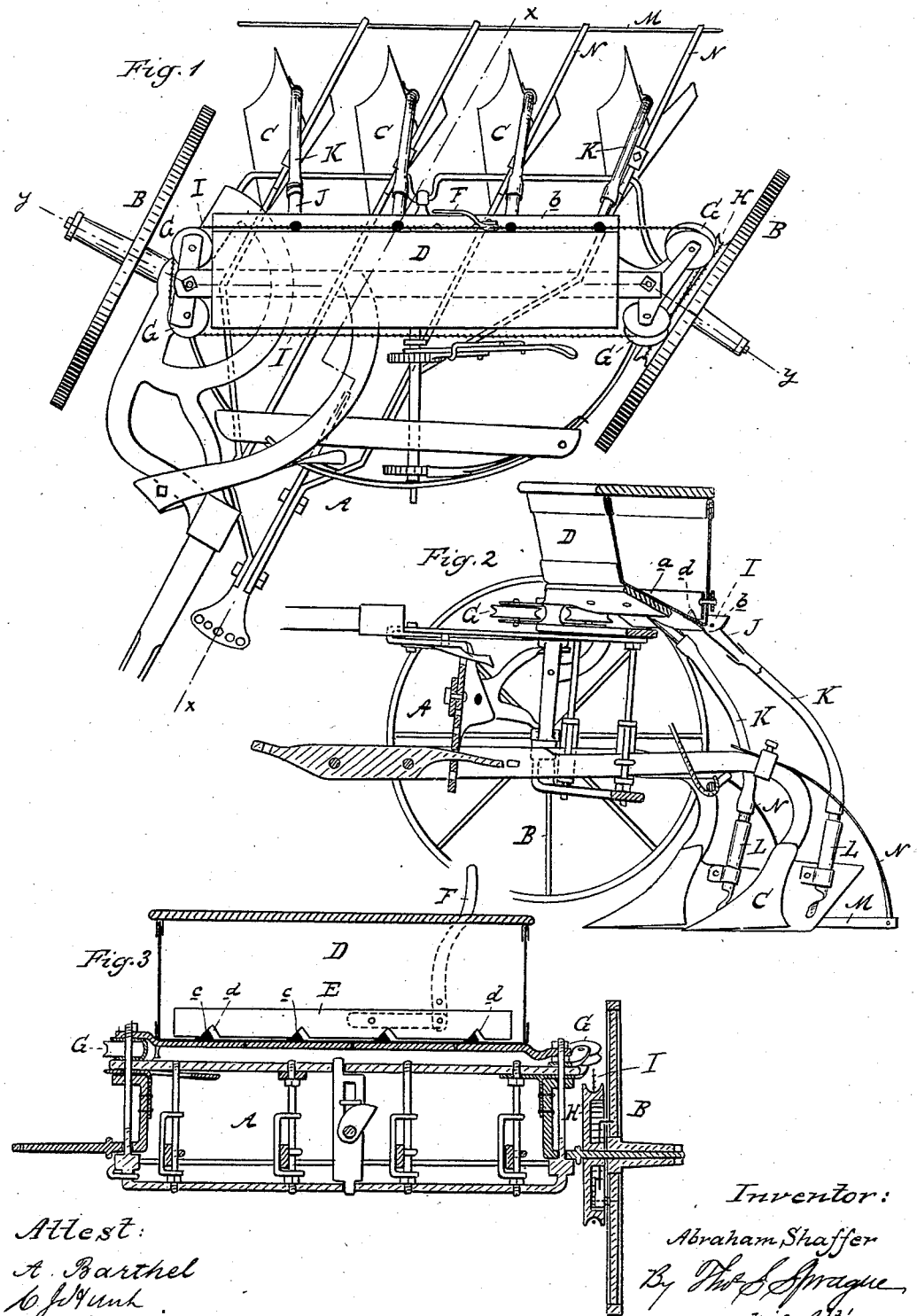
Attest:
A. Barthel
C. J. Hunt
Inventor:
Abraham Shaffer
By Thos. S. Sprague
his Att'y

UNITED STATES PATENT OFFICE.

ABRAHAM SHAFFER, OF CASSOPOLIS, MICHIGAN, ASSIGNOR OF ONE-FOURTH TO CARLTON E. SAGE, OF ELKHART, INDIANA.

SEEDING-MACHINE.

SPECIFICATION forming part of Letters Patent No. 294,158, dated February 26, 1884.

Application filed August 27, 1883. (No model.)

*To all whom it may concern:*

Be it known that I, ABRAHAM SHAFFER, of Cassopolis, in the county of Cass and State of Michigan, have invented new and useful Improvements in Seeding-Machines; and I do hereby declare that the following is a full, clear, and exact description thereof, reference being had to the accompanying drawings, which form a part of this specification.

This invention relates to certain new and useful improvements in the construction of planters or seed-sowers; and the invention consists, first, in the peculiar construction and arrangement of the devices employed for feeding seed to the spouts which conduct it to the ground; and, second, in the peculiar construction, arrangement, and various combinations of the parts, all as more fully hereinafter set forth.

In all implements designed for the purpose of sowing grain, as heretofore used, such implements have been made in the form of drills, broadcast-seeders, and roller-drills, all of which sow the seed and cover it with dirt at varying depths, some of the grain being left uncovered, other portions of it being planted too deeply, while in the roller-drill, in many instances, the seed is deposited upon the top of the earth, which has been depressed or rendered comparatively hard by the device, and is then covered with the surface or dry soil, and in every instance a great proportion of seed is lost from these facts, coupled with the fact that the greatest proportion of the seed sown rots or dries and is not productive; and, again, in the drills the seed is deposited, in many instances, in little hills, and is crowded or bunched into a small space, when but a portion of the seed so planted is productive.

The object of my invention is to construct a machine for sowing or planting the seed substantially the same as in broadcast-seeders, but to sow the seed and cover it at a uniform depth; and this result I obtain by cutting the greater portion (or the entire) of the surface with a series of plows at a uniform depth, and sowing the seed through a proper tube and distributer immediately in the rear of the plow between the landside and mold-board and covering the same with the soil disturbed to a uniform depth.

For the purpose of illustrating my invention, I will show and describe the application of the same to a gang-plow of my own invention, and for which I have applied for a separate patent, although I do not wish to confine myself to such application and combination, as this invention can readily be adapted as an attachment to any gang-plow the plows of which are susceptible of an adjustment to cut at a uniform depth.

Figure 1 is a top plan view. Fig. 2 is a section on line $x\ x$, Fig. 1. Fig. 3 is a cross-section on the line $y\ y$ in Fig. 1.

In the accompanying drawings, which form a part of this specification, A represents the frame; B, the wheels, and C a system of gang-plows, which are adapted to be adjusted so that they will cut at a uniform depth; and these plows I propose to make in the form of what is ordinarily called a "light mold-board plow." Mounted upon this frame A is a suitable hopper or seed-box, D, provided with an inclined bottom, $a$, this bottom declining from front to rear, and at the lower edge and at the rear of the box I form the trough $b$. In the rear wall of the seed-box I cut the inverted-V-shaped openings $c$, which allow the seed to flow from the seed-box into the trough $b$, the area of these openings being regulated by a slide, E, which is provided with similarly-shaped openings, $d$, such slide being operated by a lever, F, and although the area of the openings may be diminished by a certain movement of this slide, the form of the opening remains the same. Within proper bearings at each end of the frame and seed-box I journal suitable grooved pulleys, G, and upon one of the axle-arms I properly sleeve or journal a grooved pulley, H, which is provided upon its outer face with an internal ratchet, which is operated by a spring-pawl upon the wheel, or in any such manner that in a forward travel of such wheel a rotary motion will be imparted to such pulley H. Around these pulleys G and H, I pass an endless carrier, I, of any suitable construction, and which, in the operation of the device, draws the seed from in front of the openings in the bottom of the hopper along the trough and deposits or looses it in the spouts J, which project downward from such trough. The lower ends of these spouts J are connected by suitable tubing, K, preferably flexible, to a delivery-spout and spreader, L, located at the rear of the plows and between the landside and mold-board thereof.

M represents a spreader-bar, which is connected by spring-arms N, preferably to the plow-beams, although they may be secured to any other suitable part of the machine.

In practice—for instance, in sowing wheat—the seed is placed in the seed-box and the plows are adjusted so as to cut a furrow, say, two inches deep, and so set that they will, when in operation, plow or cut the entire surface, with possibly an exception of a very slight ridge between the plows. In the forward movement of the device the grain passes from the seed-box into the trough, from which it is scraped or carried along evenly by the endless carrier, and falls from the trough into the spouts, which conduct it to the spreader-spouts L behind the plows, and to all intents and purposes sow or scatter it broadcast upon the level surface which has just been turned by the plow; and the plows, as in all devices of a similar construction, stand substantially one back of the other, the mold-board of one plow throwing the dirt upon the furrow plowed by the plow in advance of it and covers the seed, while the spreader-bar M, which follows after the plows, levels the entire surface, and it must necessarily follow that the seed is planted and covered at a uniform depth and spread over almost the entire ground.

What I claim as my invention is—

1. In combination with a gang-plow the plows of which are adapted to cut furrows of uniform depth, a seeding attachment for conducting the seed to the furrows, and means, as M, in the rear of each plow for covering the seed as it is dropped, substantially as set forth.

2. A seeding attachment provided with an endless carrier running continuously in the same direction, and operated by one of the traction-wheels for continuously delivering the seed to the spout, substantially as and for the purposes described.

3. A seed-box provided with an inclined bottom, $a$, openings $c$, trough $b$, and a regulating-slide, E, in combination with an endless carrier, I, adapted to be operated from one of the traction-wheels of the device to which it is attached, substantially as and for the purposes specified.

4. In combination with a series of gang-plows, C, mounted upon a suitable frame and traction-wheel, with a seed-box D, slide E, groove-pulleys G and H, endless carrier I, spouts J K, spreader-spouts L, and spring spreader-bar M, when constructed, arranged, and operating substantially in the manner and for the purposes described.

ABRAHAM SHAFFER.

Witnesses:
H. S. SPRAGUE,
E. SCULLY.